(12) United States Patent
Bruett et al.

(10) Patent No.: US 10,933,854 B2
(45) Date of Patent: Mar. 2, 2021

(54) BRAKE MODULE FOR A HYDRAULICALLY BRAKED TRACTOR VEHICLE WHICH CAN BE COUPLED TO A PNEUMATICALLY BRAKED TRAILER VEHICLE

(71) Applicants: WABCO GmbH, Hannover (DE); AGCO International GmbH, Neuhausen am Rheinfall (CH)

(72) Inventors: Mirko Bruett, Ronnenberg (DE); Georg Frank, Marktoberdorf (DE); Stefan Prestel, Marktoberdorf (DE); Jan Spremberg, Sarstedt (DE)

(73) Assignees: WABCO GmbH, Hannover (DE); AGCO International GmbH, Neuhausen am Rheinfall (CH)

( * ) Notice: Subject to any disclaimer, the term of this patent is extended or adjusted under 35 U.S.C. 154(b) by 86 days.

(21) Appl. No.: 16/159,886

(22) Filed: Oct. 15, 2018

(65) Prior Publication Data
US 2019/0118788 A1    Apr. 25, 2019

(30) Foreign Application Priority Data
Oct. 20, 2017 (DE) .................... 10 2017 009 916.2

(51) Int. Cl.
*B60T 13/66* (2006.01)
*B60T 13/58* (2006.01)
(Continued)

(52) U.S. Cl.
CPC .......... *B60T 13/662* (2013.01); *B60T 11/108* (2013.01); *B60T 13/263* (2013.01); *B60T 13/581* (2013.01);
(Continued)

(58) Field of Classification Search
CPC .... B60T 13/662; B60T 13/581; B60T 15/041; B60T 15/027; B60T 15/181; B60T 11/108; B60T 13/263; B60T 13/683
See application file for complete search history.

(56) References Cited

U.S. PATENT DOCUMENTS

| 8,282,173 | B2* | 10/2012 | Forster | ............. B60T 7/20 303/15 |
| 2005/0029859 | A1* | 2/2005 | Bensch | ............. B60T 13/68 303/89 |
| 2009/0256416 | A1* | 10/2009 | Bensch | ............. B60T 13/683 303/17 |

FOREIGN PATENT DOCUMENTS

DE    199 55 797 A1    5/2001
DE    199 55 798 A1    5/2001
(Continued)

OTHER PUBLICATIONS

DIN 74 253,Graphische Symbole für Bremsschaltpläne, WABCO, Jan. 1994, with English translation of relevant parts, 36 pages.
(Continued)

*Primary Examiner* — Xuan Lan Nguyen
(74) *Attorney, Agent, or Firm* — Collard & Roe, P.C.

(57) ABSTRACT

A brake module for a hydraulically braked tractor coupled to a pneumatically braked trailer has a trailer control valve connected via hydraulic control inlet to a hydraulic pressure line leaving a master brake cylinder, and via pneumatic inlet to a compressed air reservoir. Hydraulic control pressure determines pneumatic output pressure level at a trailer control valve pneumatic outlet. The brake module has a break-off prevention module which, if the control line leaks or separates from the trailer control valve relative to the trailer brake system, closes a supply pressure coupling head supply line and causes trailer brake system venting. The break-off prevention module has a pneumatic supply pres-
(Continued)

sure inlet and a pneumatic tear-off control pressure inlet connected to the air reservoir independently of trailer control valve pressure inlets. Supply pressure inlet supply pressure passes through the break-off prevention module and feeds to a trailer control valve pneumatic supply pressure inlet.

5 Claims, 3 Drawing Sheets

(51) Int. Cl.
  *B60T 15/04* (2006.01)
  *B60T 15/18* (2006.01)
  *B60T 15/02* (2006.01)
  *B60T 13/26* (2006.01)
  *B60T 11/10* (2006.01)
  *B60T 13/68* (2006.01)
(52) U.S. Cl.
  CPC .......... *B60T 15/027* (2013.01); *B60T 15/041* (2013.01); *B60T 15/181* (2013.01); *B60T 13/683* (2013.01)

(56) References Cited

FOREIGN PATENT DOCUMENTS

| DE | 10 2011 122 637 A1 | 6/2013 |
| DE | 197 52 147 B4 | 8/2013 |
| EP | 2305524 A1 | 4/2011 |
| EP | 2 451 681 B1 | 5/2013 |
| EP | 3190015 A1 | 7/2017 |

OTHER PUBLICATIONS

ISO 6786, Road vehicles—Air braking systems—Identification of connections of units, First edition—Jun. 15, 1980, 4 pagse.
European Search Report in EP Application No. 18194152.7-1012 dated Mar. 4, 2019 with English translation.

* cited by examiner

BRAKE MODULE FOR A HYDRAULICALLY BRAKED TRACTOR VEHICLE WHICH CAN BE COUPLED TO A PNEUMATICALLY BRAKED TRAILER VEHICLE

CROSS REFERENCE TO RELATED APPLICATIONS

Applicants claim priority under 35 U.S.C. § 119 of German Application No. 10 2017 009 916.2 filed Oct. 20, 2017, the disclosure of which is incorporated by reference.

BACKGROUND OF THE INVENTION

1. Field of the Invention

The invention relates to a brake module for a hydraulically braked tractor vehicle.

2. Description of the Related Art

Certain hydraulically braked vehicles, in particular tractor vehicles which are used for agricultural or forestry purposes, in the form of agricultural tractors, tractors, combine harvesters, but also lightweight trucks, have a hydraulic brake system which is generally composed of a brake cylinder which is activated by a foot brake pedal and which feeds hydraulic fluid to the corresponding wheel brake cylinders of the wheels of the tractor vehicle. The trailers which can be coupled to the tractor vehicle are, in contrast to the tractor vehicle, pneumatically braked. Owing to the different pressure media, specifically hydraulic fluid for the service brake system of the tractor vehicle and compressed air for the brake system of the trailer vehicle, in such vehicle combinations it is necessary to convert the hydraulic brake pressure of the tractor vehicle into a pneumatic pressure for the brake system of the trailer. A trailer control valve which is arranged on the tractor vehicle and which can be obtained, for example, from the applicant under the part number 470 015 xxx has been used for this purpose for decades. Such trailer control valves are purely mechanical constructions; in said valves hydraulic control pressure is converted into pneumatic output pressure and fed to the trailer vehicle.

A problem can occur with such vehicles if leaks occur in the brake control lines from the trailer control valve to the trailer owing to wear or mechanical damage. Conventional, mainly mechanical, systems have hitherto not been able to detect such leaks—uncontrollable compressed air losses occur—which leads to a situation in which the trailer can no longer be braked.

What are referred to as break-off prevention modules or tear-off valves, which ensure that in the case of a leak or tearing off of a pressure line with respect to the trailer brake system, the trailer vehicle is braked in a controlled fashion in that the brake cylinders of the trailer vehicle are vented are already known from the field of purely pneumatically braked trucks with a weight above 7.5 t. Such a tear-off valve is known, for example, from EP 2 451 681 B1. However, such a tear-off valve can be used only in purely pneumatically braked vehicles, since in said vehicles the pilot-control pressures are kept in an at least approximately constant range. The pilot-control pressure which in the case of braking brings about leading braking of the trailer vehicle is also used to actuate the tear-off valve in these systems.

In motor vehicles with mixed brake systems in which therefore both hydraulic and pneumatic pressure media are used, there are however highly different pressure levels present, so that the customary tear-off valves which are intended for trucks cannot be used for vehicles of the abovementioned type. This applies, in particular, to such vehicles of the generic type in which a pressure-limiting valve is used which is intended to set the pneumatic pilot-control pressure for the trailer control valve in order to set characteristics of the service brakes of the trailer vehicle. In this context, the pressure which has been set to a lower setting can be below the activation pressure of the break-off prevention, which would bring about a situation in which the break-off prevention module is not triggered even though the tear-off situation has occurred.

DE 19 955 797 A1 and DE 19 955 798 A1 each describe a break-off prevention in which a vehicle of the generic type is braked virtually purely electronically. This break-off prevention is not suitable for a mainly mechanically acting brake device either.

DE 197 52 147 B4 discloses a brake system for a hydraulically braked motor vehicle which can be coupled to a pneumatically braked trailer, in which brake system the hydraulic pressure of the service brake is used only indirectly to control the pneumatic brake system of the trailer vehicle. In said vehicle the hydraulic pressure of the outlet lines of the master brake cylinder is converted into an electrical signal by a pressure sensor and is fed to an electronic control device which evaluates the acquired pressure signals and switches a proportional relay valve which is intermediately connected between a compressed air reservoir and a purely pneumatically controlled trailer control valve. Break-off prevention is not a subject matter of this document.

SUMMARY OF THE INVENTION

The invention comes in here, the object of which is to improve a brake module of the type described at the beginning to the effect that a break-off prevention function is provided in hydraulically braked tractor vehicles, which brake module can be coupled to a pneumatically braked trailer vehicle which is of simple design and functions reliably.

This object is achieved with a brake module which has the features according to the invention.

The object is therefore achieved in a surprisingly simple way in that the break-off prevention module is provided with a pneumatic supply pressure inlet and with a pneumatic tear-off control pressure inlet, wherein the tear-off control pressure inlet is connected to a compressed air reservoir of the tractor vehicle independently of pneumatic pressure inlets of the trailer control valve, wherein supply pressure which is present at the supply pressure inlet can be passed through the break-off prevention module and fed to a pneumatic supply pressure inlet of the trailer control valve.

The pneumatic pilot-control pressure of the trailer control valve is therefore used exclusively to perform pilot-control of the brake system of the trailer vehicle and not, as is otherwise customary in trucks, also to actuate the break-off prevention module. This makes the break-off prevention module independent of pressure fluctuations which can arise in the case of connection to the pilot-control pressure of the trailer control valve. The continuously identical supply pressure is used directly or indirectly, with the result that the break-off prevention module is triggered or can be controlled more precisely. Since the break-off prevention module is more or less independent of the trailer control valve, this provides the further advantage that the break-off prevention module does not necessarily have to be combined structurally with the trailer control valve but rather can also be attached at a remote location on the tractor vehicle. However, at the same time there is the advantageous possibility of combining the break-off prevention module and trailer control module to form one structural unit.

The invention can also be added to by virtue of the fact that there is provision that a normally closed 3/2-way valve is arranged between the compressed air reservoir and the tear-off control pressure inlet of the break-off prevention module, which 3/2-way valve is switched into the open position when the service brake is activated, and which 3/2-way valve releases compressed air to the tear-off control pressure inlet of the break-off prevention module.

In another practical development of the invention there is provision that in the case of damage to the trailer control line a valve of the break-off prevention module is displaced, and a restrictor of the break-off prevention module becomes active, and the connection from the compressed air reservoir to the brake module is shut off and the supply line leading to a supply coupling head is vented.

An addition to the invention which is distinguished by virtue of the fact that the trailer control valve has a pneumatic pilot-control pressure inlet, into which compressed air for performing pilot-control of the brake system of the trailer vehicle can be fed, is particularly practical.

This refinement can also be added to by virtue of the fact there is provision that a pressure-limiting valve is arranged in a supply line between the normally closed 3/2-way solenoid valve and the pilot-control pressure inlet of the trailer control valve.

In one particularly preferred embodiment of the invention there is provision that at least the break-off prevention module and the trailer control valve are arranged in a common housing.

There can alternatively be provision that the break-off prevention module and the trailer control valve are flange-connected to one another.

In another practical development of the invention there is provision that the break-off prevention module, the trailer control valve and the 3/2-way solenoid valve are arranged in a common housing.

BRIEF DESCRIPTION OF THE DRAWINGS

Further advantages and refinements of the invention are described in more detail below and on the basis of an exemplary embodiment in the drawing, in which.

DETAILED DESCRIPTION OF PREFERRED EMBODIMENTS

Figure 1:
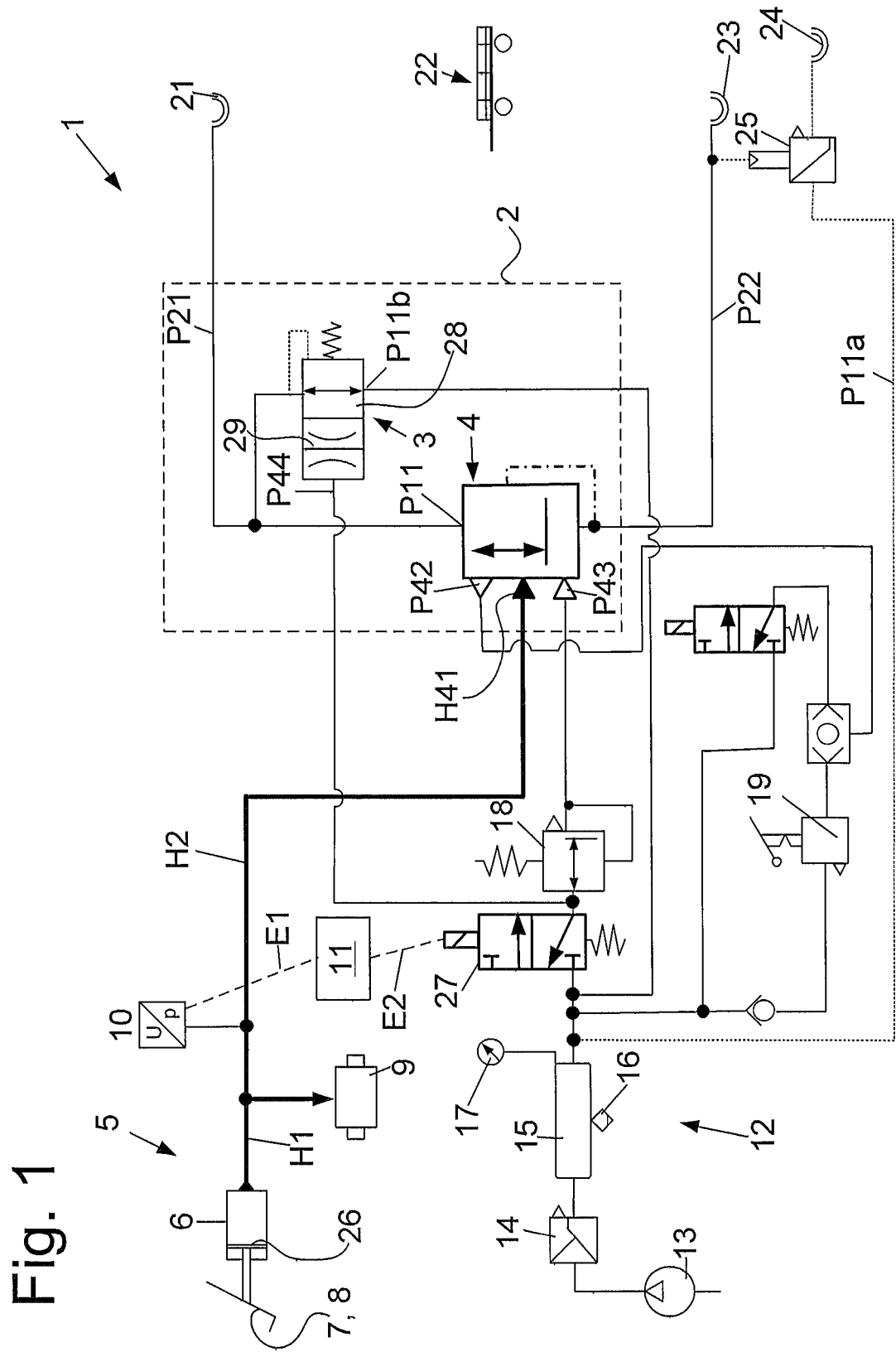
FIG. 1 shows a first exemplary embodiment of a switching pattern of a brake module according to the invention.

FIG. 1 illustrates a first exemplary embodiment of a brake module 1 according to the invention as a switching pattern. The symbols in the drawing correspond to the illustration to DIN 74253, while the pneumatic and/or hydraulic connections and lines are implemented in accordance with DIN ISO 6786, wherein for the sake of better delineation from the reference symbols relating to the components a "P" precedes the pneumatic lines and connections and an "H" precedes the hydraulic lines and connections, while the electrical lines have a prefix "E".

The brake module 1 which is arranged on a tractor vehicle which is not illustrated in FIG. 1 has a break-off prevention module 3 and a trailer control valve 4 within a housing 2 which is indicated only schematically.

The components of the hydraulically activated service brake 5 are arranged outside the brake module 1, of which components only a master brake cylinder 6, which can be activated by a brake activation element 7 in the form of a brake pedal 8, is illustrated in a simplified form in FIG. 1. Hydraulic fluid passes via a hydraulic pressure line H1 to the individual wheel brake cylinders of the tractor vehicle, which is indicated only schematically by a wheel brake cylinder 9 in FIG. 1. A hydraulic branch line H2, through which hydraulic fluid is fed to the trailer control valve 4, branches off from the hydraulic pressure line H1. A pressure sensor 10, which senses the hydraulic pressure present in the hydraulic pressure line H1 and converts it into an electrical signal which is fed to control electronics 11 of the tractor vehicle via an electrical line E1 in order to detect activation of a brake pedal 8, is connected to the hydraulic pressure line H1. As an alternative to the pressure sensor 10, the activation of a brake pedal 8 can be detected by means of pedal switches (not illustrated) which could already be present in a known fashion for activating the brake lights (not illustrated). However, the pressure sensor 10, which directly feeds a corresponding signal to the control electronics 11 is preferred especially if a pressure sensor 10 is used which can not only sense the start of the braking operation and communicate it to the control electronics 11 but can also sense and communicate a change in pressure. In addition to the service brake 6, via which hydraulic pressure can be generated, a compressed air-generating system 12 is also present on the tractor vehicle, which compressed air-generating system 12 is composed of a compressor 13 which is connected to the drive motor of the tractor vehicle, a pressure regulator 14, a compressed air reservoir 15 with drainage valve 16 and manometer 17, as well as a pressure-limiting valve 18 which is arranged downstream of the compressed air reservoir 15. A pneumatic supply pressure at the level of approximately 8.5 bar is fed to a pneumatic pilot-control pressure inlet P43 of the trailer control valve 4 via this pressure-limiting valve 18. In parallel with this pressure-limiting valve 18, a handbrake valve 19 is connected to the compressed air reservoir 15, which, when activation takes place, outputs a pneumatic pressure to a pneumatic control pressure inlet P42 to the brake module 1.

The supply pressure is passed through the brake module 1 from the compressed air reservoir 15 via the pneumatic supply pressure inlet P11 and is fed via a pneumatic outlet P21 of the brake module 1 to a supply coupling head 21, to which a corresponding supply line of a trailer vehicle 22 (only indicated in FIG. 1) can be coupled. The trailer vehicle 22 can be connected to the supply coupling head 21 and to a control pressure coupling head 23 via corresponding coupling heads (not illustrated). If a trailer vehicle of a relatively old design with a single-line brake is to be coupled to the tractor vehicle, a single-line coupling head 24 can also be connected into the system, which single-line coupling head 24 is connected by a relay valve 25 to the control pressure coupling head 23 or via a pneumatic supply pressure line P11a to the compressed air reservoir 15.

The supply pressure is also fed to a pneumatic supply pressure inlet P11b of the break-off prevention module 3 from the compressed air reservoir 15. When the trailer control line P22 is intact, the supply pressure is forced through the break-off prevention module 3 and fed to a pneumatic supply pressure inlet P11 of the trailer brake valve 4.

The supply of compressed air from the compressed air accumulator 15 to the brake module 1 via the pressure-limiting valve 18 is controlled by a normally closed 3/2-way solenoid valve 27 which is connected to the control unit 11 via an electric line E2. If the driver depresses the brake pedal 8, an electrical signal is generated which causes the 3/2-way solenoid valve 27 to switch and supply pressure to be fed to the brake module 1 via the pressure-limiting valve 18.

In a normal case, that is to say when the control line P22 is intact, the tractor vehicle with the trailer vehicle 22 coupled thereto is braked as follows:

If the driver depresses the brake pedal 8, a piston 26 of the master brake cylinder 6 moves with the corresponding movement of the brake pedal 8 and forces hydraulic fluid to the wheel brake cylinders 9 of the tractor vehicle via the hydraulic pressure line H1, as a result of which the wheels of the tractor vehicle are braked. The movement of the piston 26 of the master brake cylinder 6 generates a hydraulic pressure which is fed via the hydraulic line H2 to the hydraulic control inlet H41 of the trailer brake valve 4, which brings about a movement of a hydraulic piston. At the same time, the 3/2-way solenoid valve 27 is opened and pneumatic supply pressure is fed to the break-off prevention module 3 via the pressure-limiting valve 18, is passed through said break-off prevention module 3 and fed to the control inlet P11 of the trailer brake valve 4, which taken together causes control pressure to be fed into the control line P22 of the trailer vehicle, as a result of which the latter is braked. Since compressed air was already passed through the pressure-limiting valve to the pilot-control inlet P43, the trailer vehicle 22 has already been pre-braked, which a person skilled in the art refers to as leading braking and which is intended to prevent the trailer vehicle 22 from running up against the tractor vehicle.

If the trailer control line P22 is damaged, for example as a result of rupture, tearing off or as a result of other influences, i.e. a pressure drop occurs as a result of air flowing out of the trailer control line P22 in an uncontrolled fashion, a valve 28 of the break-off prevention module 3 is displaced, as a result of which a restrictor 29 is activated. As a result, compressed air can no longer continue to flow from the compressed air reservoir 15 to the brake module 1, with the result that the supply line P21 is vented, which gives rise to venting of the brake cylinders of the trailer vehicle 22, and therefore causes it to be braked gradually.

Figure 2:
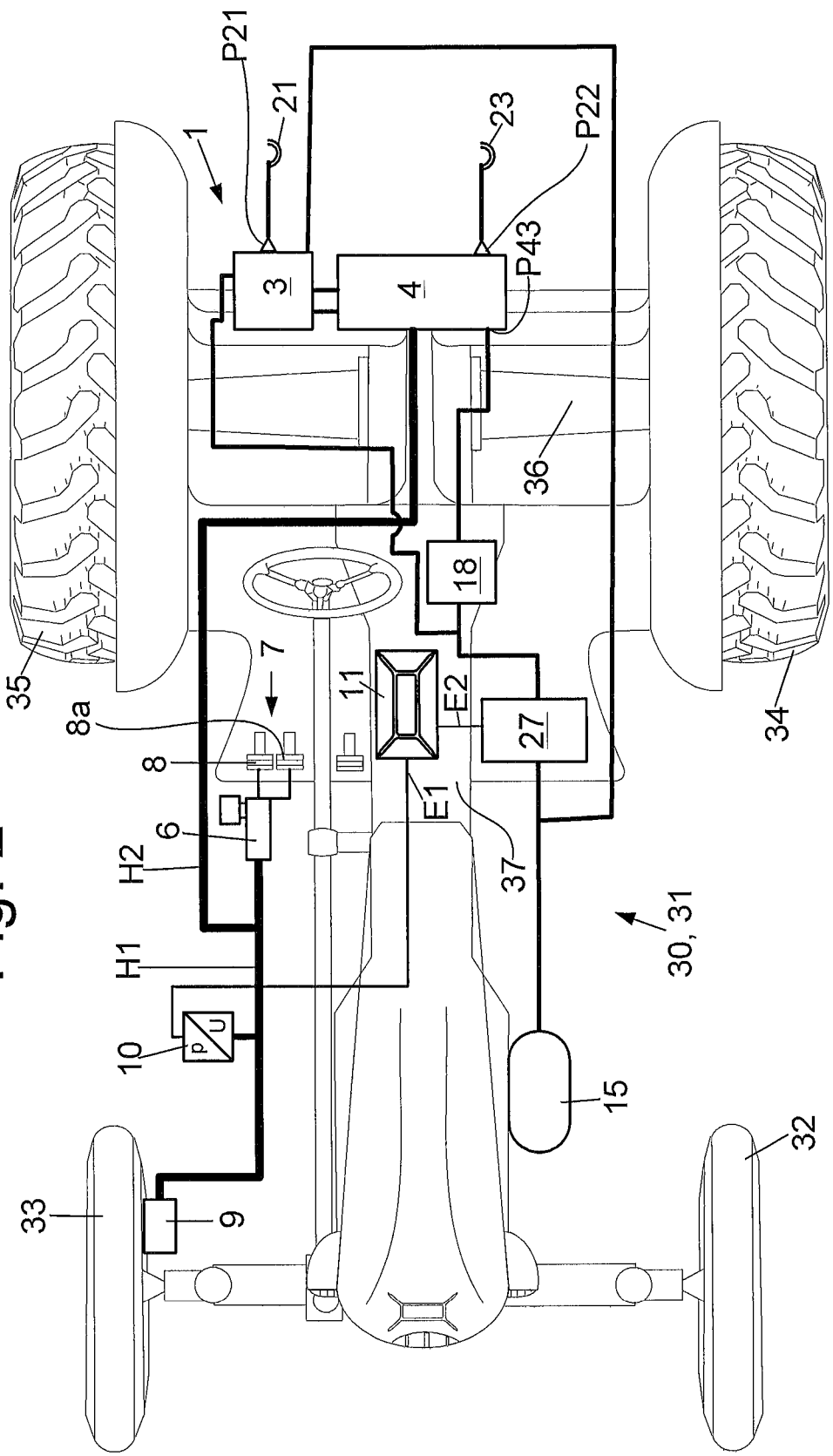
FIG. 2 shows a schematic view of a tractor vehicle, with components of the brake module from FIG. 1 which are installed thereon.

FIG. 2 illustrates a tractor vehicle 30 in the form of an agricultural tractor 31. The latter has, in a manner known per se, two steered front wheels 32, 33 and two non-steered rear wheels 34, 35. The front wheels 32, 33 and the rear wheels 34, 35 are each assigned a wheel brake (not illustrated) which can be respectively activated by a wheel brake cylinder 9, wherein in FIG. 2 just one wheel brake cylinder 9 is illustrated for the sake of simplicity, said wheel brake cylinder 9 being assigned to the right-hand front wheel 33. FIG. 2 is intended to illustrate, in particular, where the essential components of the brake module 1 are or can be arranged on the tractor vehicle 30. In FIG. 2 it is also possible to see that—as is customary in the case of agricultural tractors—the brake activation element 7 has two brake pedals 8, 8a, by means of which the brakes of the right-hand or left-hand side of the vehicle can be activated in order to generate steering braking when travelling on non-sealed roads. The brake pedals 8, 8a are mechanically connected to the master brake cylinder 6, through which hydraulic pressure is fed to the wheel brake cylinders 9 via the hydraulic pressure line H1. The hydraulic pressure line H2, through which hydraulic control pressure is fed to the trailer control valve 4 (illustrated only schematically in FIG. 2), branches off from the hydraulic pressure line H1. The trailer control valve 4 is arranged in the region of a rear axle 36 of the tractor vehicle 34, as is the break-off prevention module 3. The control electronics 11, which according to FIG. 2 is arranged on a transmission block 37, can also be arranged at another location on the vehicle, for example it can be flange-connected to the brake module 1 or can also be located at some other location on the tractor vehicle. In a differing illustration according to FIG. 2 it is also possible for the trailer control valve 4 to be flange-connected to the electro-pneumatic brake module.

In the way described, a brake module 1 is provided, which, by virtue of its modules 3 and 4, can have any desired combination or whose modules 3, 4 can be arranged at any desired or particularly suitable location on the tractor vehicle 30. It is therefore possible for the individual modules 3, 4 to be flange-connected to one another or to be mounted distributed over the tractor vehicle 30. It is also possible for the trailer control valve 4 and the break-off prevention module to be mounted in a common housing. The 3/2-way valve 27 and/or the pressure-limiting valve 18 can also be arranged in such a housing.

Figure 3:
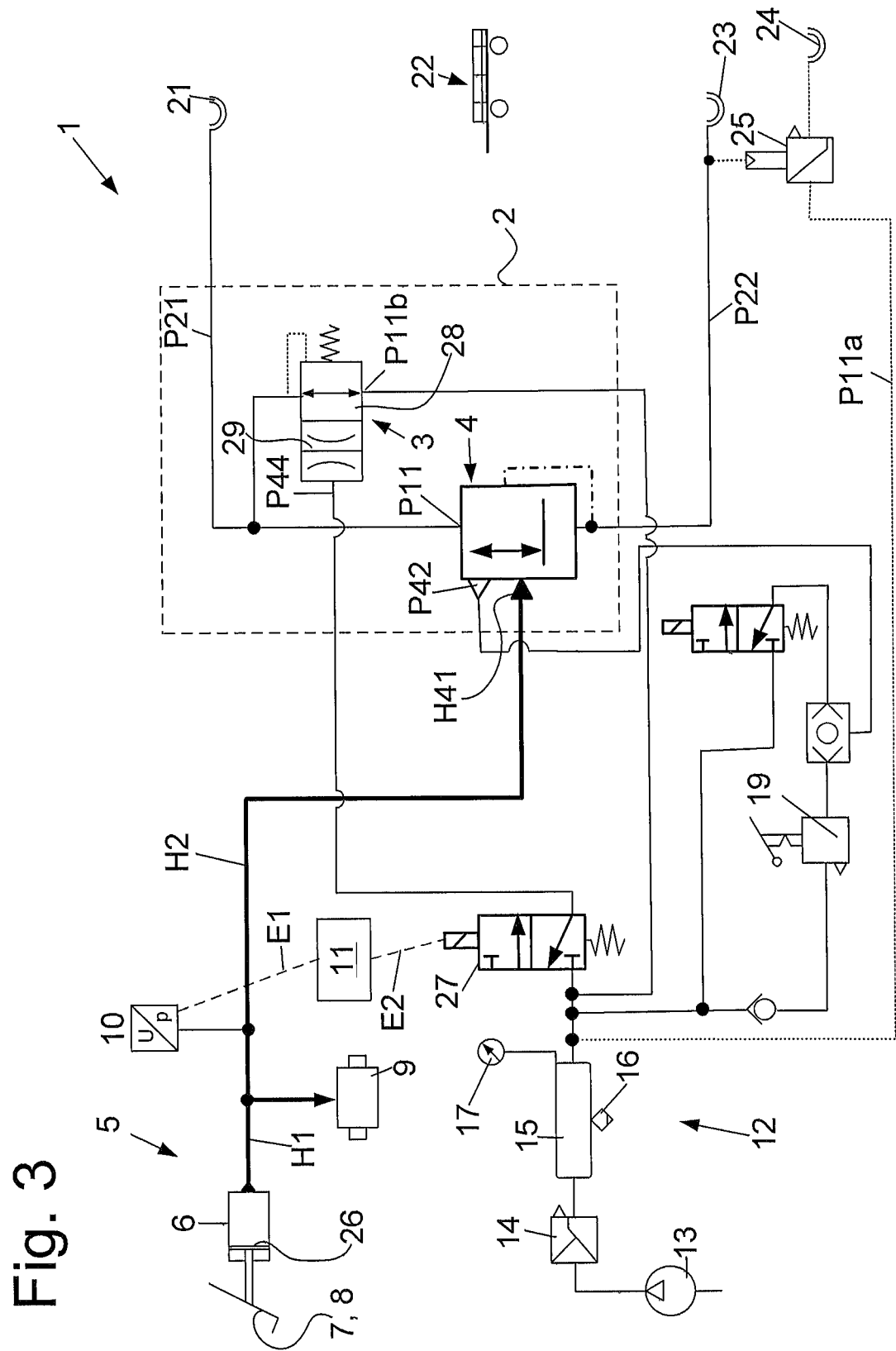
FIG. 3 shows a second exemplary embodiment of a switching pattern of a brake module according to the invention.

FIG. 3 illustrates a secondary exemplary embodiment of a brake module 1 according to the invention which corresponds largely to that illustrated in FIG. 1 and uses the same reference signs for identical parts. The function of the brake module 1 according to FIG. 3 also corresponds basically to that described above with respect to FIG. 1; therefore, details will be provided below exclusively on the differences with respect to the brake module 1 according to FIG. 1. The significant difference of the arrangement according to FIG. 3 is that there is no pressure-limiting valve present there and no pilot-control inlet on the trailer control valve 4. There are in fact also trailer control valves which are of simple design and which do not have a pilot-control connection, with the result that there is no need for a pressure-limiting valve there either. The embodiment according to FIG. 3 is intended to show that the solution according to the invention can also be used for trailer control valves of this type.

The exemplary embodiments of a brake module 1 according to the invention which are shown in FIGS. 1 and 3 show a trailer brake valve 4 with a hydraulic control inlet H41, as is known for a what is referred to as a single-circuit brake system. Alternatively, in the case of a what is referred to as a dual-brake system, a trailer brake valve 4 with two hydraulic control inlets for each brake circuit can be used.

In addition to the use of the brake module 1 according to the invention as described above for purely hydraulically braked tractor vehicles it is also conceivable to use the brake module for tractor vehicles which have what is referred to as an "Air over Hydraulic" (AoH). In such systems, known for example from DE 10 2011 122 637 A1, the entire brake system is basically embodied in a pneumatic fashion, and only the wheel brake cylinders of the individual wheels are braked hydraulically. In these systems, what are referred to as AoH converters are used which convert pneumatic pressure into hydraulic pressure for the wheel brake cylinders. With these vehicles it would actually be possible to permit purely pneumatic actuation of a correspondingly embodied redundancy valve, which is known per se. However, under certain circumstances and for particular applications it can be advantageous if the hydraulic pressure of the wheel brake cylinders is used to operate a brake module 1 of the type described above.

Although only a few embodiments of the present invention have been shown and described, it is to be understood that many changes and modifications may be made thereunto without departing from the spirit and scope of the invention.

LIST OF REFERENCE SYMBOLS (PART OF THE DESCRIPTION)

1 Brake module
2 Housing
3 Break-off prevention module
4 Trailer control valve
5 Service brake
6 Master brake cylinder
7 Brake activation element
8 Brake pedal
8a Brake pedal
9 Wheel brake cylinder
10 Pressure sensor
11 Control electronics
12 Compressed air-generating system
13 Compressor
14 Pressure regulator
15 Compressed air reservoir
16 Drainage valve
17 Manometer
18 Pressure-limiting valve
19 Handbrake valve
20 Redundancy valve
21 Supply pressure coupling head
22 Trailer vehicle
23 Control pressure coupling head
24 Single-line coupling head
25 Relay valve
26 Piston
27 3/2-way solenoid valve
28 Valve
29 Restrictor
30 Tractor vehicle
31 Agricultural tractor
32 Front wheel
33 Front wheel
34 Rear wheel
35 Rear wheel
36 Rear axle
37 Transmission block
E1 Electrical line
E2 Electrical line
H1 Hydraulic pressure line
H2 Hydraulic branch line
H41 Hydraulic control inlet
P11 Pneumatic supply pressure inlet
P11a Pneumatic supply pressure line
P11b Pneumatic supply pressure inlet of 3
P21 Pneumatic outlet
P22 Pneumatic control pressure outlet
P42 Pneumatic control pressure inlet
P43 Pneumatic pilot-control pressure inlet
P44 Pneumatic tear-off control pressure inlet

What is claimed is:

1. A brake module for a hydraulically braked tractor vehicle which is coupled to a pneumatically braked trailer vehicle, wherein the tractor vehicle has a hydraulically activated service brake which has at least one master brake cylinder, which is activated by a brake activation element, for generating a hydraulic pressure in at least one wheel brake cylinder of at least one wheel of the tractor vehicle, and wherein the brake module has a trailer control valve which is connected via a hydraulic control inlet to a hydraulic pressure line which leaves the master brake cylinder, and via a pneumatic inlet to the compressed air reservoir, wherein the hydraulic control pressure determines the level of the pneumatic output pressure at a pneumatic outlet of the trailer control valve,
wherein the brake module has a break-off prevention module which, in the case of leakage or tearing off of the control line from the trailer control valve with respect to the brake system of the trailer vehicle, shuts off a supply line to a supply pressure coupling head and brings about venting of the brake system of the trailer vehicle,
wherein the break-off prevention module is provided with a pneumatic supply pressure inlet and with a pneumatic tear-off control pressure inlet, wherein the tear-off control pressure inlet is connected to a compressed air reservoir of the tractor vehicle independently of pneumatic pressure inlets of the trailer control valve, wherein supply pressure which is present at the supply pressure inlet passes through the break-off prevention module and fed to a pneumatic supply pressure inlet of the trailer control valve,
wherein a normally closed 3/2-way valve is arranged between the compressed air reservoir and the tear-off control pressure inlet of the break-off prevention module, which 3/2-way valve is switched into an open position when the service brake is activated, and which 3/2-way valve releases compressed air to the tear-off control pressure inlet of the break-off prevention module,
wherein the trailer control valve has a pneumatic pilot-control pressure inlet, into which compressed air for performing pilot-control of the brake system of the trailer vehicle is fed, and
wherein a pressure-limiting valve is arranged in a supply line between the normally closed 3/2-way solenoid valve and the pilot-control pressure inlet of the trailer control valve.

2. The brake module according to claim 1, wherein in the case of damage to the trailer control line a valve of the break-off prevention module is displaced, and a restrictor of the break-off prevention module becomes active, and the connection from the compressed air reservoir to the brake module is shut off and the supply line leading to a supply coupling head is vented.

3. The brake module at least according to claim 1, wherein at least the break-off prevention module and the trailer control valve are arranged in a common housing.

4. The brake module according to claim 1, wherein the break-off prevention module and the trailer control valve are flange-connected to one another.

5. The brake module according to claim 1, wherein the break-off prevention module, the trailer control valve and the 3/2-way solenoid valve are arranged in a common housing.

* * * * *